(12) United States Patent
Hadi

(10) Patent No.: US 12,210,635 B2
(45) Date of Patent: Jan. 28, 2025

(54) SYSTEMS AND METHODS FOR ELECTRONIC DOCUMENT EXECUTION, AUTHENTICATION, AND FORENSIC REVIEW

(71) Applicant: ZorroSign, Inc., Phoenix, AZ (US)

(72) Inventor: Shamsh Hadi, Los Angeles, CA (US)

(73) Assignee: ZorroSign, Inc., Phoenix, AZ (US)

( * ) Notice: Subject to any disclaimer, the term of this patent is extended or adjusted under 35 U.S.C. 154(b) by 318 days.

(21) Appl. No.: 17/835,836

(22) Filed: Jun. 8, 2022

(65) Prior Publication Data

US 2023/0214502 A1    Jul. 6, 2023

Related U.S. Application Data

(63) Continuation-in-part of application No. 17/355,083, filed on Jun. 22, 2021, now Pat. No. 11,636,218,
(Continued)

(51) Int. Cl.
*G06F 21/60* (2013.01)
*G06F 40/117* (2020.01)
(Continued)

(52) U.S. Cl.
CPC .......... *G06F 21/602* (2013.01); *G06F 40/117* (2020.01); *G06V 40/33* (2022.01); *H04L 9/0637* (2013.01); *H04L 9/0866* (2013.01)

(58) Field of Classification Search
CPC . G06F 21/602; G06F 40/117; G06K 9/00161; H04L 9/0637; H04L 9/0866; G06V 40/33
See application file for complete search history.

(56) References Cited

U.S. PATENT DOCUMENTS 9,559,847 B2    1/2017 Hurst
9,565,175 B1 *  2/2017 Saylor ..................... G06F 21/10
(Continued)

FOREIGN PATENT DOCUMENTS

GB          2 541 040 A       2/2017
WO    WO-2011/005869 A2      1/2011

OTHER PUBLICATIONS

International Preliminary Report on Patentability, Ch. I, for PCT/IB2019/000612 dated Nov. 28, 2019 (7 pages).
(Continued)

*Primary Examiner* — Stephen T Gundry
(74) *Attorney, Agent, or Firm* — Foley & Lardner LLP

(57) ABSTRACT

Embodiments disclosed herein include systems and methods for generating and editing digital documents, and applying electronic signatures to the documents. The system further performs forensic operations on digital documents for determining the authenticity of the document data or metadata and validating the status of document. The forensic operations may include, for example, security operations, audit trail analysis, and authenticity/verification analysis, which the system performs on an input document being scrutinized for authenticity and a master digital document purportedly corresponding to the input digital document. The system may apply a machine-learning architecture to identify discrepancies otherwise imperceptible to humans or to speed the review process. The system may generate a report for the user who submitted the forensics request indicating the results of the forensic operations. The available forensics operations and level of information about the master digital document are tailored to permissions afforded to the submitting-user.

21 Claims, 8 Drawing Sheets

Related U.S. Application Data which is a continuation of application No. 16/400,953, filed on May 1, 2019, now Pat. No. 11,042,651.

(60) Provisional application No. 62/666,339, filed on May 3, 2018.

(51) Int. Cl.
*G06V 40/30* (2022.01)
*H04L 9/06* (2006.01)
*H04L 9/08* (2006.01)

(56) References Cited

U.S. PATENT DOCUMENTS

| | | | |
|---|---|---|---|
| 9,613,190 B2 | 4/2017 | Ford et al. | |
| 9,654,463 B2 | 5/2017 | Brannon | |
| 9,734,625 B2* | 8/2017 | Hadley | G06T 17/00 |
| 9,760,697 B1 | 9/2017 | Walker | |
| 9,858,245 B2* | 1/2018 | Floyd | G06F 16/93 |
| 9,866,393 B1 | 1/2018 | Rush et al. | |
| 9,923,904 B1 | 3/2018 | Saylor et al. | |
| 10,108,811 B1 | 10/2018 | Walker | |
| 10,318,646 B2 | 6/2019 | Fu et al. | |
| 10,361,871 B2 | 7/2019 | Saxena et al. | |
| 10,382,382 B2* | 8/2019 | Chae | H04L 51/52 |
| 11,049,349 B2* | 6/2021 | Onischuk | G07C 13/00 |
| 11,107,172 B2* | 8/2021 | Budlong | G06F 16/909 |
| 11,139,955 B1 | 10/2021 | So et al. | |
| 11,283,397 B2* | 3/2022 | Kunesh | F24S 20/50 |
| 11,594,307 B2* | 2/2023 | Eteminan | G06F 3/0482 |
| 2004/0139327 A1 | 7/2004 | Brown et al. | |
| 2012/0086971 A1 | 4/2012 | Bisbee et al. | |
| 2013/0066717 A1 | 3/2013 | Marovets | |
| 2014/0032913 A1 | 1/2014 | Tenenboym et al. | |
| 2015/0010216 A1* | 1/2015 | Papastefanou | G06V 30/36 382/121 |
| 2015/0067347 A1* | 3/2015 | Dease | H04L 9/3247 713/176 |
| 2015/0222615 A1 | 8/2015 | Allain | |
| 2015/0310188 A1 | 10/2015 | Ford et al. | |
| 2016/0012465 A1* | 1/2016 | Sharp | G06Q 20/321 705/14.17 |
| 2016/0196297 A1 | 7/2016 | Almgren | |
| 2016/0255242 A1* | 9/2016 | Osadchyy | H04N 1/00408 358/1.14 |
| 2017/0032112 A1 | 2/2017 | Follis et al. | |
| 2017/0041296 A1 | 2/2017 | Ford et al. | |
| 2017/0259586 A1* | 9/2017 | Wilkinson | B41J 2/04586 |
| 2017/0329813 A1* | 11/2017 | Fackelman | G16H 50/70 |
| 2017/0345394 A1* | 11/2017 | Bansal | H04L 63/0838 |
| 2018/0006825 A1 | 1/2018 | Saxena et al. | |
| 2018/0018460 A1* | 1/2018 | Brown | G06F 21/554 |
| 2018/0053121 A1 | 2/2018 | Gonzalez et al. | |
| 2018/0062572 A1 | 3/2018 | Kunesh | |
| 2018/0062852 A1 | 3/2018 | Schmahmann | |
| 2018/0095606 A1 | 4/2018 | Chae et al. | |
| 2018/0107950 A1* | 4/2018 | Gonzalez | G06Q 30/02 |
| 2018/0239959 A1* | 8/2018 | Bui | G06F 16/93 |
| 2018/0276270 A1 | 9/2018 | Bisbee et al. | |
| 2018/0301222 A1 | 10/2018 | Dew et al. | |
| 2018/0336554 A1 | 11/2018 | Trotter | |
| 2018/0350180 A1 | 12/2018 | Onischuk | |
| 2019/0012342 A1 | 1/2019 | Cohn | |
| 2019/0019184 A1 | 1/2019 | Lacey et al. | |
| 2019/0066241 A1 | 2/2019 | Budlong | |
| 2019/0121846 A1* | 4/2019 | Kim | G06F 3/03545 |
| 2019/0188813 A1 | 6/2019 | Maljanian | |
| 2019/0319948 A1 | 10/2019 | Triola et al. | |
| 2020/0258176 A1* | 8/2020 | Gibson | H04L 9/50 |
| 2020/0349125 A1* | 11/2020 | Earley | H04L 63/126 |
| 2021/0158036 A1* | 5/2021 | Huber, Jr. | G06V 30/413 |
| 2021/0169417 A1 | 6/2021 | Burton | |
| 2021/0271681 A1 | 9/2021 | Jayaram et al. | |
| 2021/0342962 A1 | 11/2021 | Budlong | |
| 2021/0352142 A1* | 11/2021 | Jayaram | G06Q 20/26 |

OTHER PUBLICATIONS

International Search Report and the Written Opinion for PCT/IB2019/000612 dated Nov. 28, 2019 (12 pages).
First Examiner's Report and Search Report on UAE app. P6001523/2020 dated May 17, 2023 (8 pages).
International Search Report and Written Opinion on PCT App. PCT/US2023/024099 dated Aug. 30, 2023 (15 pages).
First Examiners Requisition CA App. 3,099,444 dated Jul. 13, 2023 (9 pages).

\* cited by examiner

SYSTEMS AND METHODS FOR ELECTRONIC DOCUMENT EXECUTION, AUTHENTICATION, AND FORENSIC REVIEW

CROSS-REFERENCE TO RELATED APPLICATIONS

This application is a continuation-in-part of U.S. application Ser. No. 17/355,083, entitled "System and Method for Securing Electronic Document Execution and Authentication," filed Jun. 22, 2021, which is a continuation of U.S. application Ser. No. 16/400,953, entitled "System and Method for Securing Electronic Document Execution and Authentication," filed May 1, 2019, now issued as U.S. Pat. No. 11,042,651, which claims priority to U.S. Provisional Application No. 62/666,339, entitled "System and Method for Securing Electronic Document Execution and Authentication," filed May 3, 2018, each of which is incorporated by reference herein in its entirety.

TECHNICAL FIELD

This application generally relates to digital document management, including generating, storing, controlling access to digital documents. In particular, the application relates to forensic operations for determining the authenticity and validating the status of digital documents. The embodiments may include training and applying a machine-learning architecture for conducting certain forensic operations to review and analyze authenticity of the document content data and document metadata.

BACKGROUND

There are various known techniques to authenticate a person's signature on a document. Before electronic documents became the de facto standard they are today, it was common for someone to sign a document in ink and apply a seal or stamp to the document to indicate the authenticity of that document. Still, it was always possible for someone to tamper with the document, or forge signatures or the seals.

With the growing popularity of digital documents, partial digitalization of business processes is taking place to facilitate or even mandate digital documentation. In digitalization, actions ranging from creation of documents, to storage of unsigned or signed documents, to subsequent retrieval of signed documents, are conducted digitally. For example, a document may be created on a computer and subsequently printed, signed manually (with wet ink) or electronically, then faxed or delivered via courier/post, or scanned into the computer and finally shared electronically via email or by using other file transfer mechanisms. There are real cases where documents are mixed-signed, where documents are signed with analogue wet-ink by some parties and electronically signed by other parties. In this modern world, with the range of process variants, documents can still be tampered with and the signatures can be forged.

Conventional document signing programs rely on the Internet to inform signers that a document is ready for review and signatures. For security, these conventional programs likewise rely upon the cryptography techniques commonly employed by websites (e.g., SSL), some image of an electronic signature, and a timestamp. Relying on encryption to securely transfer the document over the Internet only protects the document from interception while in transit across the networks or while the document is stored on some cloud-server does not protect against the myriad known or unforeseen ways to tamper with or otherwise discredit a digital document. These conventional approaches capture a limited amount of knowledge about the document, users, devices, or document history, which offers limited capacity for auditing records about the document. The conventional approaches also cannot provide in depth forensic analysis of the document's history or content.

The volume of documentation is also a challenge to authenticating documents in the modern environment. Determining the authenticity or validity of digital documents can be impractical, inefficient, difficult, or altogether impossible for humans to perform, as humans could not identify or mitigate all potential issues. In the digital realm, changes to a document's content or metadata are often imperceptible by humans.

What is needed are means for capturing and storing updates to digital documents, including a means for storing document data in an immutable and/or auditable form. What would also be beneficial is a means for analyzing content, metadata, or other information about digital documents to determine the authenticity or validation status of digital documents.

SUMMARY

Embodiments disclosed herein address the shortcomings in the art discussed above and may provide any number of additional or alternative benefits as well. Embodiments include systems and methods for generating and editing electronic documents, and applying electronic signatures to the digital documents. The system further includes software programming for performing various forensic operations on digital documents for determining the authenticity of the document data or metadata and validating the status of document. The forensic operations may include, for example, security operations, audit trail analysis, and authenticity/verification analysis. The security operations, for example, confirm the permissions and rights afforded to the submitting user, as well as the users involved with preparing the digital document. The audit trail analysis performs post-signature fraud detection by determining whether the content or metadata of the input digital document under scrutiny varies from the content or metadata of a corresponding master digital document stored in the system database or blockchain, across the lifecycle of the master digital document. The authentication and verification operations include, for example, comparing the input digital document against the master digital document to confirm the authenticity of the electronic signature, digital signature, and the content of the input digital document.

In an embodiment, a computer-implemented method comprises obtaining, by a computer, an input digital document having a visualization element having encoded data representing an association between the input digital document and a master digital document; identifying, by the computer, one or more discrepancies in the input digital document by applying a machine-learning architecture on a first set of one or more features of the input digital document and a second set of features of the master digital document; and generating, by the computer, a report for display at a client device according to the one or more discrepancies in the digital document.

In another embodiment, a system comprises a computing device comprising a processor configured to obtain an input digital document having a visualization element having encoded data representing an association between the input digital document and a master digital document; identify one or more discrepancies in the input digital document by applying a machine-learning architecture on a first set of one or more features of the input digital document and a second set of features of the master digital document; and generate a report for display at a client device according to the one or more discrepancies in the digital document.

In another embodiment, a computer-implemented method comprises receiving, by a computer, one or more update inputs for a master digital document from a client device, the update inputs associated with at least one of content of the master digital document and metadata of the master digital document; for an iteration of one or more iterations of receiving the one or more update inputs: generating, by the computer, a hash for the master digital document using the update inputs and a visualization element affixed to the master digital document; generating, by the computer, a blockchain block containing the particular iteration of the master digital document using the hash of the master digital document for the particular iteration; receiving, by a computer, an input digital document having the visualization element having encoded data representing an association between the input digital document and the master digital document; identifying, by the computer, one or more blockchain blocks containing one or more iterations of the input digital document; and identifying, by the computer, one or more discrepancies in the input digital document by applying a machine-learning architecture on a first set of one or more features of the input digital document and a second set of features of the master digital document.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
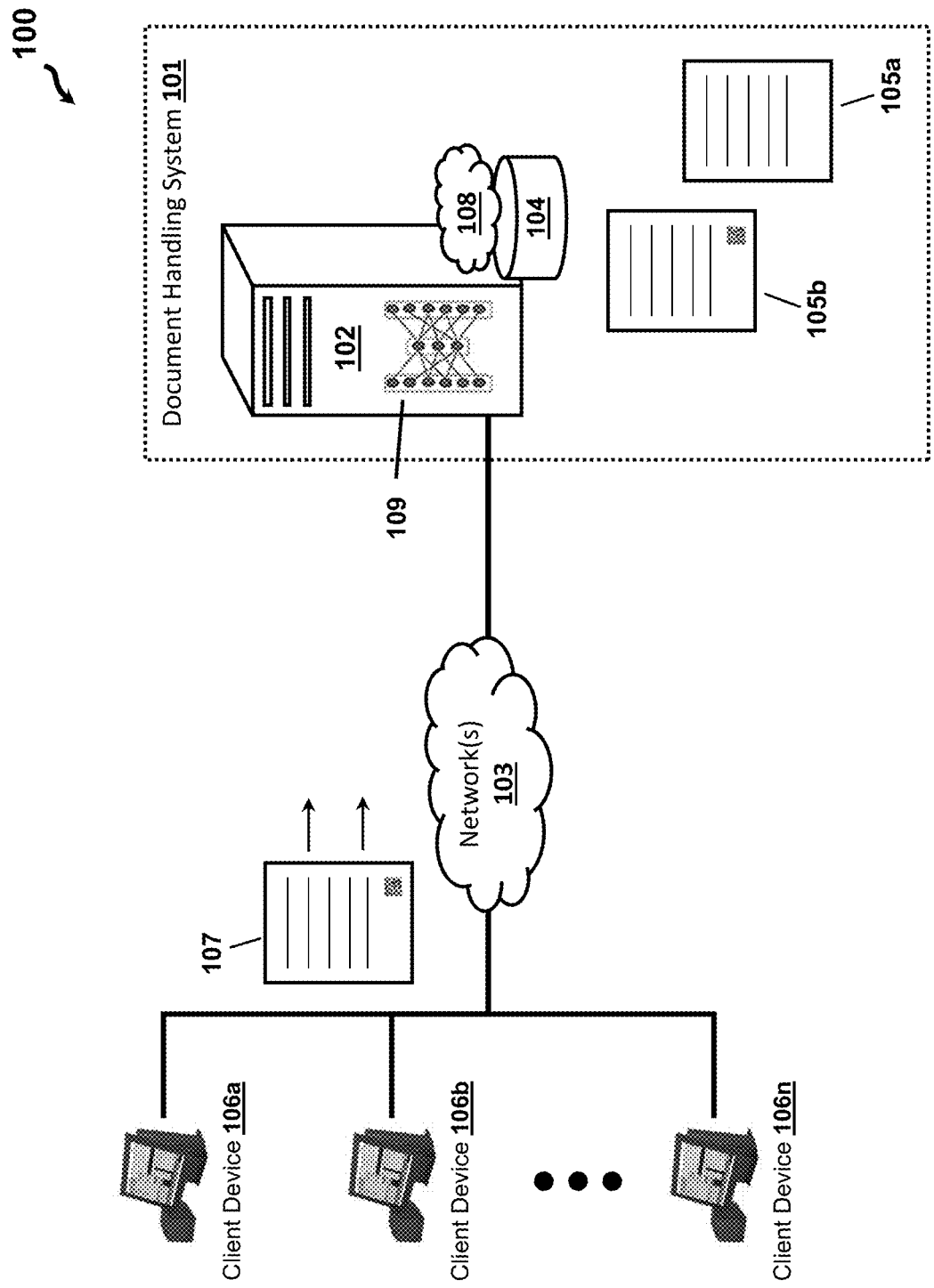
FIG. 1 shows components of a system for issuing, managing, and evaluating digital documents, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein include systems and methods for managing digital documents, including processes for preparing, updating, and applying electronic signatures to the digital documents. A document handling system may include one or more computing devices (e.g., servers) that perform the various operations of a document handling service according to inputted instructions received from client devices. The server may host an environment allowing users to generate or import new digital documents, as well as review or edit the digital documents, using the client devices. The client devices may further allow the users to generate and apply the users' electronic signatures to the digital document. When the document is finalized, the server may generate and add a visualization element to the document that uniquely identifies and secures the digital document. This visualization element may signify the completion of the document signing ceremony, which starts from document formation and ending with the signing process by all parties involved. Users of the document handling system include, for example, users who generate, access, edit, or otherwise prepare digital documents (sometimes called "preparing users"); and users who sign digital documents (sometimes called "signing users"). In many instances, a preparing user may also be a signing user, though not always. For instance, large teams of users may review, negotiate, and edit the digital document, whereas only a subset of users may sign the document.

Thereafter, a copy of the original document, attachments, and metadata (e.g., authentication information, security information, validation information, user information, document information) may be stored into one or more data records of a particular storage location, such as a system database or a blocks of a blockchain, where the data records for the digital document are available for review by the various users. The data records for the digital document may be retrieved by scanning or uploading the visualization element using software associated with the document handling system (e.g., web application, mobile application).

Certain details of the components, features, and functions of the document handling system need not be fully described herein. Non-limiting examples of potential embodiments and features discussed herein may be found in U.S. application Ser. No. 16/400,953, entitled "System and Method for Securing Electronic Document Execution and Authentication," filed May 1, 2019, which is incorporated by reference in its entirety.

Further to the document preparation features, the embodiments may include systems and methods for performing forensic review operations (referred to as "forensic operations") on digital documents generated using the document handling system. The end-users may submit forensic requests to the server (sometimes called "submitting users"

or "requesting users"), where the forensic requests contain instructions and parameters for executing one or more forensic operations. These forensic operations may include various processes for evaluating the authenticity or validity of a particular digital document identified by the submitting user.

The forensic operations may include, for example, security operations (or "security checks"), audit trail analysis, and authenticity/verification analysis. The security operations, for example, confirm the permissions and rights afforded to the submitting user, as well as the users involved with preparing the digital document. The audit trail analysis nay perform post-signature fraud detection by determining whether the content or metadata of the input digital document under scrutiny varies from the content or metadata of a corresponding master digital document (sometimes called a "stored digital document") stored in the system database or blockchain. Additionally or alternatively, the audit trail analysis may, for example, perform verification and authentication of the users' electronic signatures, digital signatures, and other metadata associated with the input digital document and/or the stored digital document, across this lifecycle of the master digital document. The authentication and verification operations include, for example, comparing the input digital document against the master digital document to confirm the authenticity of the electronic signature, digital signature, and the content of the input digital document. The forensic operations mentioned above are not an exhaustive listing; nor are the types or categories of forensic operations mentioned above intended to be absolute boundaries or an exhaustive listing of potential types or categories of forensic operations.

In some cases, a user accessing features of the system may be registered with the document handling system (sometimes called "registered users") at some time before the user accesses or requests the relevant features of the document handling system. An unregistered user may access a registration process of the server and inputs various types of user data, including user information (e.g., name, email address), user credentials (e.g., username, password), and an input for the user's wet signature that the user's client device converts into the user's electronic signature for signing digital documents later. The server may generate additional user data, such as one or more user identifiers and PKI cryptographic values (e.g., public-private key pair, electronic certificate, digital signature), among others. The server may store the various types of user data into a data record of the system's database or blockchain, thereby registering the user with the document handling system.

A user need not register with the document handling system in order to access the features of the system. For instance, an unregistered user may submit a forensics request to the system to evaluate a hardcopy or softcopy input digital document purportedly created using the document handling system. The unregistered user may submit the forensic request and transmits (e.g., uploads, emails) the digital version of the input digital document. The server may query the storage location using the visualization element affixed to the input digital document and retrieves the corresponding master digital document. The server may perform one or more forensic operations for the input digital documents, such as identifying similarities or differences between the input digital document and the stored master digital document. The discrepancies may highlight inaccuracies or indicate potential instances of malicious tampering in the input digital document, such as manipulation of a digital signature or manipulation of content of the digital document. The forensic operations available to a particular user may be limited by whether the user is registered or unregistered, and/or based upon the permissions configured for the master digital document stored in the data records.

FIG. 1 shows components of a system 100 for issuing, managing, and evaluating unexecuted digital documents 105a and executed digital documents 105b (collectively, digital documents 105). The system 100 includes any number of client devices 106a-106n (collectively, client devices 106) and a document handling system 101 having one or more management servers 102 and one or more management databases 104. Embodiments may comprise additional or alternative components or omit certain components from those of FIG. 1, and still fall within the scope of this disclosure. It may be common, for example, to include management servers 102, even though FIG. 1 shows only one management server 102. Embodiments may include or otherwise implement any number of devices capable of performing the various features and tasks described herein. For example, FIG. 1 shows the management server 102 as a distinct computing device from the management database 104, though in some embodiments the management server 102 includes the management database 104.

The system 100 comprises various hardware and software components of one or more networks 103 interconnecting the various components of the system 100, which may include any number of public or private networks, implementing any number of computing-communication protocols, software, and related hardware. Non-limiting examples of such networks 103 may include a Local Area Network (LAN), Wireless Local Area Network (WLAN), Metropolitan Area Network (MAN), Wide Area Network (WAN), and the Internet. The communication over the networks 103 may be performed in accordance with various communication protocols, such as Transmission Control Protocol and Internet Protocol (TCP/IP), User Datagram Protocol (UDP), and IEEE communication protocols. Likewise, the client devices 106 may communicate with any end user-facing infrastructure (e.g., document handling system 101) via the various networks 103. Non-limiting examples of computing networking hardware may include switches and routers, among other additional or alternative hardware used for hosting, routing, or managing data communication via the Internet or other medium of computing-device communications.

The document handling system 101 shown in FIG. 1 represents a computing network infrastructure comprising physically and logically related software and electronic devices, managed or operated by an enterprise organization hosting a document signature management and forensic review service. The hardware and software components of the document handling system 101 host and provide various document handling operations (e.g., document preparation, signature management, forensic review), where the components intercommunicate via one or more internal networks 108 of the document system 101. The internal network 108 includes any number of computing-communication components (e.g., hardware, software, protocols) for handling communications physical and/or logically internal to the document system 101 infrastructure, amongst the components of the document handling system 101.

The document handling system 101 may operate on behalf of individual end users or for end user-facing enterprises that frequently require signatures (e.g., financial service providers, governmental entities). The document handling system 101 may host a cloud-based service allowing client devices 106 of users to, for example, generate, edit, and execute (i.e., sign) digital documents 105. The document handling features of the document handling system 101 further allow the client devices 106 of the users to submit forensic requests that request the document handling system 101 to perform forensic operations, such as validating a status of a previously executed digital document 105b or analyzing and conducting a forensic analysis on the particular executed digital document 105b.

The users operating the client devices 106 may be registered or unregistered with the document handling system 101. The registration may affect the types of features available to the users and/or the information available to the users. For instance, the registered users may participate in preparing the new unexecuted digital document 105a and request any number of forensic operations for a stored executed digital document 105b. By contrast, the unregistered users may be prohibited from participating in preparing the unexecuted digital document 105a, but the unregistered user may request only certain forensic operations for the stored executed digital document 105b or may receive only certain information about the executed digital document 105b resulting from the forensic operations.

When registering with the document handling system 101, a user inputs certain information via the user interface of the client device 106, such as various types of user data and a signature equivalent to the user's wet signature. The management server 102 generates various additional user data associated with the user, such as a user identifier, electronic signature, electronic certificate, and/or encryptions keys, among other potential types of user information. The management server 102 stores this user information into the management database 104, as a database record for the newly registered user. The management server 102 or other devices of the document handling system 101 reference this registered user information when performing certain operations or when determining the user's permissions.

The client devices 106 include any number of computing devices operated by end-users to generate, edit, or sign unexecuted digital documents 105a or submit forensic requests for previously signed executed digital documents 105b. The client devices 106 may be any communications or computing device that the end-user operates to access and interact with the features and functions hosted by the management server 102 of the document handling system 101. The client devices 106 include any number of hardware and software components for communicating via the one or more networks 103 with the management server 102 or with other client devices 106. Non-limiting examples of the client devices 106 may include mobile devices (e.g., smartphones, tablets) and computers (e.g., laptops, desktops, servers).

The client device 106 may execute one or more software programs for accessing the services and features hosted by the management server 102 of the document handling system 101. This software programming of the client device 106 includes browser software or other locally installed software configured to communicate with the features and functions of the management server 102. The client device 106 comprises a plurality of software components, including an operating system and a document workspace, which includes a user interface generated by a software program that accesses the features of the management server 102. The document workspace may be a locally installed and executed software program (e.g., MS Word®) or web-based word-processing application (e.g., Google Docs®) accessible using a web browser that communicates with a web server program of the management server 102. Non-limiting examples of the client device 106 may include mobile devices (e.g., smartphones, tables) and computers (e.g., laptops, desktops, servers).

The client device 106 may generate, update, access, and otherwise document data for stored digital documents 105 that are stored into one or more storage locations. In some embodiments, the storage location includes the management database 104 of the document system 101. In such embodiments, the client device 106 communicates instructions with the management server 102 causing the management server 102 to query the management database 104 and perform various operations on the digital documents 105 stored in the management database 104. Additionally or alternatively, in some embodiments, the storage location for the digital documents 105 includes a blockchain associated with the document handling system 101. The client device 106 communicates instructions with the management server 102 and/or to the client devices 106 of the system 100, causing the management server 102 to query the blockchain of the client devices 106 perform various operations on the digital documents 105 stored on the blockchain. In such embodiments, the client devices 106 include software programming that enables the client devices 106 to participate as nodes of the blockchain.

In operation, an end-user prepares an unexecuted digital document 105a using the locally installed or web-based document workspace accessed by the client device 106. The client device 106 uploads or otherwise imports the new unexecuted digital document 105a to the management server 102. The management server 102 transmits the unexecuted digital document 105a, or a hyperlink to the unexecuted digital document 105a, to the client devices 106 of the users participating in preparing the unexecuted digital document 105a, allowing the participating users to review, edit, and/or sign the unexecuted digital document 105a. When accessing, editing, or signing the unexecuted digital document 105a, the client device 106 or management server 102 captures various types of metadata about the users (e.g., user data, user identifiers, permissions, user certificates), the document (e.g., timestamps, permissions, document certificates), storage location (e.g., block identifier), and/or the client devices 106 (e.g., IP address, MAC address, device name, device type, GPS location). The management server 102 may add this metadata (sometimes called a "tag") to the metadata of the unexecuted digital document 105a or may store this metadata into the particular data record storage location for the unexecuted digital document 105a.

During a later signing process, the client device 106 or management server 102 applies the signing-user's electronic signature to the unexecuted digital document 105a, thereby generating the executed digital document 105b. The electronic signature may be stored in a storage location of the client device 106 or the management database 104. Alternatively, the client device 106 may capture, generate, or request the user's electronic signature as a sub-process related to the signing process. The electronic signature may be an image representation of the user's wet signature or a uniquely-identifying cryptographic value generated by the client device 106 or the management server 102 for the particular user to apply as the user's electronic signature. In some implementations, the electronic signature comprises a combination of the image representation of the user's wet signature and the cryptographic value generated by the client device 106 or the management server 102. After the management server 102 applies each of the electronic signatures to the unexecuted digital document 105a, the management server 102 outputs the now-finalized executed digital document 105b. The management server 102 stores the executed digital document 105b into one or more storage locations (e.g., database record of the management database 104, block of the blockchain).

In addition or as an alternative to document preparation functions, the client device 106 further executes or accesses the forensic operations, enabling the end-users to submit forensic requests to the management server 102. The forensic operations evaluate the authenticity and/or validity of a particular input digital document 107 on behalf of the submitting user (sometimes referred to as "requesting user"). The client device 106 transmits the forensics request to the management server 102, where the forensics request includes instructions for the management server 102 to perform one or more forensic operations and various parameters for performing the forensic operation. The instructions of the forensics request include, for example, the input digital document 107 uploaded for review, various parameters for conducting a forensic operation, and/or an indicator of the particular forensic operation (e.g., verify validity status of the input digital document 107, forensic review of document content for tampering). The software of the client device 106 accesses the input digital document 107 and uploads (or otherwise transmits) the input digital document 107 to the management server 102. Alternatively, the parameters of the forensics request indicates a storage location (e.g., blockchain block, database record) for the input digital document 107, which the management server 102 queries to retrieve the input digital document 107. The parameters of the forensics may further include user information for the submitting user, such as user credentials that the submitting user entered to log into the services of the document handling system 101.

The management server 102 includes one or more computing devices of the document handling system 101, performing various operations for handling digital documents 105, including operations for generating, updating, storing, and validating the digital documents 105 and, in some cases, managing identities of end-users. The management server 102 includes any computing device comprising hardware and software components and capable of performing the features and processes described herein. The management server 102 includes hardware and software for communicating via one or more networks 103 with the client devices 106 and the management database 104. Non-limiting examples of the management server 102 includes servers, laptops, desktops, and the like.

The management server 102 includes cloud-based or cloud-accessible software that executes the various operations according to inputs received from the client devices 106. For instance, in some embodiments, the management server 102 executes webserver software (e.g., Microsoft IIS®, Apache HTTP Server®) or the like for hosting websites and web-based software applications. In such embodiments, the client devices 106 execute browser software for accessing and interacting with the website or other cloud-based features hosted and executed by the management server 102.

The management server 102 receives instructions from the client device 106 for performing the various operations from the client device 106 via the one or more networks 103. During the operations for generating or editing the unexecuted digital document 105a, the management server 102 captures certain metadata (e.g., user information, document information, timestamps) and stores the new or updated unexecuted digital document 105a with the metadata into the storage location (e.g., data record of management database 104, block entry of the blockchain). The user generating or editing the unexecuted digital document 105a includes the permissions for end-users accessing and editing the unexecuted digital document 105a, which indicates the document rights for end-users or other client devices 106. The client device 106 transmits the new or updated unexecuted digital document 105a to the management server 102, and the management server 102 transmits the new or updated unexecuted digital document 105a to each of the client devices 106 associated with each of the signing-users involved with finalizing and signing the unexecuted digital document 105a.

In some embodiments, the management server 102 may extract and store physical features of a handwritten signature of end-users. The server may request the users to register with the software application (e.g., web application or mobile application) provided by the management server 102. During the registration operation, the management server 102 captures the user's genuine handwritten signature. and stores the signature in a format that the management server 102 applies to the unexecuted digital document 105a on behalf of the signing-user. For example, the management server 102 transmits a request to the client devices 106 of each registered user to sign the unexecuted digital document 105a and the user interface of the client device 106 presents the request to the signing-user. The signing-user's client device 106 applies the signing-user's handwritten signature and/or electronic signature. In some cases, rather than pre-configuring and storing the signing-user's signature, the signing-user may sign the unexecuted digital document 105a at the time of executing the unexecuted digital document 105a. The signing-user inputs the handwritten signature by moving the cursor or running the signing-user's finger in a specific area (e.g., signature box) included in the user interface of the touch screen of the client device 106.

The management server 102 may verify that users accessing the digital document 105 (e.g., preparing user, signing user, submitting user) has corresponding rights (e.g., document editing rights, signature rights) as indicated by the permissions of the digital document 105. In some embodiments, after the management server 102 receives and authenticates the signing-user's credentials (e.g., user identifier, password) at login. The management server 102 sets the permissions of the digital document 105 that establish the rights and privileges for the end-users. For example, the management server 102 sets permissions for signing-users to edit portions of the unexecuted digital document 105a or sign the unexecuted digital document 105a. In this example, the management server 102 prohibits the end-user from editing or signing the unexecuted digital document 105a if the end-user's credentials do not match the credentials having the requisite permissions. In this way, the management server 102 may ensure that each user only accesses and edits the unexecuted digital document 105a according to the permissions assigned to the particular user.

The document permissions may further govern the forensic operations that a submitting user is permitted to request the management server 102 perform for a given input digital document 107. The document permissions for the corresponding executed digital document 105b indicate the amount or types of data that the submitting user may access, as well as controlling the forensic operations available to the submitting user. For example, the signing-user may request certain forensic operations on the input digital document 107 that would ultimately output comparatively more detailed information about the executed digital document 105b, such as a detailed redline highlighting changes to the content or changes to the metadata when comparing the input digital document 107 against the corresponding executed digital document 105*b*. As another example, the submitting user could be a third-party who was not a party to preparing and signing the executed digital document 105*b*. This third-party submitting user intends to authenticate and validate the input digital document 107 corresponding to the particular executed digital document 105*b*, by submitting a request for a forensic operation the merely confirms the authenticity of the input digital document 107 and that the executed digital document 105*b* is valid and not expired. In this example, the forensic operation generates and outputs less-detailed information about the document, such as a simple binary indicator that the input digital document 107 is an authentic representation (unchanged) of the executed digital document 105*b* and that the executed digital document 105*b* remains valid and effective.

To determine that the executed digital document 105*b* is valid and not expired, the management server 102 may validate, for example, the electronic certificates of the signing-users, the electronic certificate of the executed digital document 105*b*, the digital signatures of the signing-users, and/or the electronic signatures of the signing-users. As explained below, The management server 102 queries a certificate authority to validate the various cryptographic values (e.g., electronic certificates, digital signatures) for the executed digital document 105*b* and/or the signing-users. The management server 102 evaluates the electronic signatures applied to the input digital document 107 based on the physical features of the handwritten signature of the electronic signatures applied to the executed digital document 105*b* and/or stored in the management database 104. In particular, the management server 102 compares the physical features of the received signature displayed on the face of the input digital document 107 against the electronic signature in the stored executed digital document 105*b* and/or against the stored handwritten signature stored in the management database 104.

The management server 102 executes software for, or communicates with, the certificate authority that manages a PKI infrastructure and the relevant encryption-related operations. The certificate authority, for example, issues, manages, validates, and revokes the various types of cryptographic values (e.g., encryption keys, digital signatures, electronic certificates) associated with the end-users and/or the digital documents 105. The certificate authority issues the cryptographic data to the registered users during a registration operation. In operation, the management server 102, for example, applies the user's electronic signature, digital signature, and/or electronic certificate to the unexecuted digital document 105*a* during operations for generating, updating, or signing the unexecuted digital document 105*a*.

The management server 102 generates and transmits a report for display at the user interface of the client device 106, according to the software (e.g., browser webpage, PDF viewer) and communications protocols (e.g., HTTP, TCP/IP) executed by the client device 106. The management server 102 generates the report based upon the results of performing the forensics operations on the input digital document 107 and/or stored digital document 105. Moreover, the management server 102 generates the report using an amount of information relative to the permissions afforded to the submitting user.

In certain circumstances, the management server 102 may execute software programming for performing optical character recognition (OCR) on the input digital document 107. This may occur, for example, when the management server 102 received a computer file containing a scanned version or image of the input digital document 107 from the client device 106, such that the computer file containing the input digital document 107 does not include character-related metadata. In some embodiments, the management server 102 performs one or more conventional OCR routines on the input digital document 107 to identify the particular alphanumeric characters for content of the input digital document 107.

Additionally or alternatively, in some embodiments, the management server 102 executes software defining any number of layers and functions of one or more machine-learning architectures 109 for OCR operations. The machine-learning architecture 109 performs the OCR operations on the input digital documents 107, which the management server 102 received in a format without the structural metadata needed for computing devices and software to recognize text or structure within the content of the input digital document 107. The management server 102 applies the machine-learning architecture 109 containing the layers trained for OCR, where the layers of the machine-learning architecture 109 extract features of the content, which include, for example, the alphanumeric characteristics, word strings, language structure (e.g., paragraphs, line breaks), character-spacing, line-spacing, font(s), number of signatures, number of images, and other characteristics of the document content of the input digital document 107. The machine-learning architecture 109 may also extract the corresponding features for the content of the corresponding digital document 105 to compare the respective feature sets, thereby improving the quality of the OCR output for the input digital document 107.

In some implementations, when conducting certain forensics operations the management server 102 applies the same or similar machine-learning architecture 109 to determine a level of similarity or differences between the content of the input digital document 107 and the corresponding digital document 105. In addition, the machine-learning architecture 109 may further determine the level of similarity or differences between the metadata of the input digital document 107 and the corresponding digital document 105. The machine-learning architecture 109 outputs the identified differences and/or output a score. The management server 102 may determine, for example, that the input digital document 107 is too different (e.g., tampered with) from the digital document 105 if the score exceeds a threshold.

The management database 104 contains user information and document information, among other types of information referenced by devices and operations of the system 100. The management database 104 may include databases hosted on component devices (e.g., management server 102) of the document handling system 101 and/or a blockchain hosted on any number of participating nodes (e.g., management server 102, client devices 106), where the databases comprise any number of database records and the blockchain comprises any number of block entries. The management database 104 may be hosted by any number of computing devices of the system 100 comprising hardware and software components, including non-transitory machine-readable storage. For example, the management database 104 is hosted by a server computer of the document handling system 101 (e.g., management server 102). As another example, the management database 104 is hosted as a blockchain by a server computer of the document handling system 101 (e.g., management server 102) and/or participating nodes of the system 100 (e.g., client devices 106). Where the blockchain stores the digital documents 105, the management server 102 generates a block identifier for the digital document 105 indicating the particular block containing the digital document 105. The management server 102 encodes the block identifier, or a pointer to the block identifier, into the visualization element generated for the digital document 105 during the signature and finalization operations.

The management database 104 includes the various types of user data for registered users or unregistered users who engaged with the document handling system 101 at some time. The user data may include user information, user credentials, and cryptographic values issued to the user, among other types of information. The management server 102 references the user data stored in the management database 104 when performing various operations, such as authenticating the user during a login operation, preparing the unexecuted digital document 105a, or when executing the forensic operations on the input digital document 107 and on the corresponding executed digital document 105b.

The management database 104 contains various types of document data for the digital documents 105. The management database 104 may include data records for the completed executed digital documents 105b or the completed unexecuted digital documents 105a. The management database 104 may further contain data records for partially completed unexecuted digital documents 105a, where the management server 102 generates and stores new data records each instance that a preparing user updates or revises the incomplete unexecuted digital document 105a. The management server 102 and/or the client device 106 capture and store the various user metadata and/or document metadata during a document revision operation, and store such metadata into the new data record. In this way, the management server 102 may generate or reconstruct an audit trail of content revisions to the particular digital document 105 through the lifecycle, which includes the metadata identifying the users responsible for the content revisions and other metadata establishing an auditable trail of the life of the digital document 105. In some cases, the management server 102 outputs some or all of this audit trail data to a submitting user during a forensic operation. And in some cases, the management server 102 queries the audit trail data to output certain results for the particular forensic operation.

In operation, a new unexecuted digital document 105a is prepared on a particular client device 106a and is imported into management server 102. The executed digital document 105a is sent to one or more other client devices 106b-d for review, editing, and execution. To execute the unexecuted digital document 105a, the client devices 106 includes inputs and metadata on the unexecuted digital document 105a to sign, date, initial, check box, enter text, enter name, company, title, phone number, email address, sticky note, electronic signature, digital signature, and/or digital certificate. The electronic signature, equivalent to a person's wet signature, is captured at the time of registration or signature at the client devices 106. For instance, the signing-users are prompted to create a genuine handwritten signature that is captured through the client devices 106 prior to or at the time of signing the unexecuted digital document 105a. The user data that is captured by the management server 102 or client device 106 includes user data, device data, and/or signature information, such as user information, vector information, physical characteristics, a security certificate, metadata, biometrics, and signatory attribution, which the management server 102 may embed into the content or metadata of the unexecuted digital document 105a when the signing-user is signing. The image of the signature that the signing-user sees on the executed digital document 105b, displayed via the GUI, is a visual representation of the electronic signature and/or the metadata (of the signature or signing-user). The management server 102 may generate a unique token and a visualization element based on the encoded content and/or metadata of the executed digital document 105b.

Throughout the lifecycle of the document in preparing, editing, signing, and finalizing the digital document 105, the management server 102 may store the content and metadata of the digital document 105 into database records or blocks of a blockchain for each of the iterative updates to the digital document 105. For example, the management server 102 may store the content and metadata of the digital document 105 in blocks of a private permissions-based blockchain. The management server 102 or other nodes of the blockchain (e.g., client devices 106) update the blocks at preconfigured interval (e.g., two minutes) or triggering condition (e.g., update to the digital document 105). Additionally, the digital document 105 is stored in a hash within the blocks on the management server 102 or other nodes of the blockchain. The management server 102 or participating nodes use the PKI infrastructure of the document handling system 101 to access the digital document 105, such that the visualization element or other unique identifier is the public key and the private key is the particular client device 106a for the preparing user (who was part of the workflow) or the particular client device 106b for a reviewing user (who was assigned "read only" permissions to access the digital document 105). For each iteration of the digital document 105 (e.g., every two minutes, every update to the digital document 105), the management server 102 or other participating nodes generate a new block and/or new hash for the digital document 105 and stores the new block and/or hash on the blockchain. When the management server 102 receives the visualization token for the particular input digital document 107 or digital document 105, the management server 102 queries the blockchain (or management database 104) for stored master management server 102, brings the hashes together and assembles the digital document 105.

Additionally or alternatively, at every iterative step or at a preconfigured interval before the digital document 105 is finalized, the management server 102 assigns user certificates and/or document certificates to the digital document 105, and stores the content and metadata (e.g., certificates) of the iterative copy of the digital document 105 into iterative blocks or data records that represent an auditable trail of the lifecycle of the digital document 105. The management server 102 may query these iterative blocks or data records associated with the particular digital document 105 when performing audit trail operations or other forensic operations for a particular input digital document 107 corresponding to the digital document 105.

Figure 2:
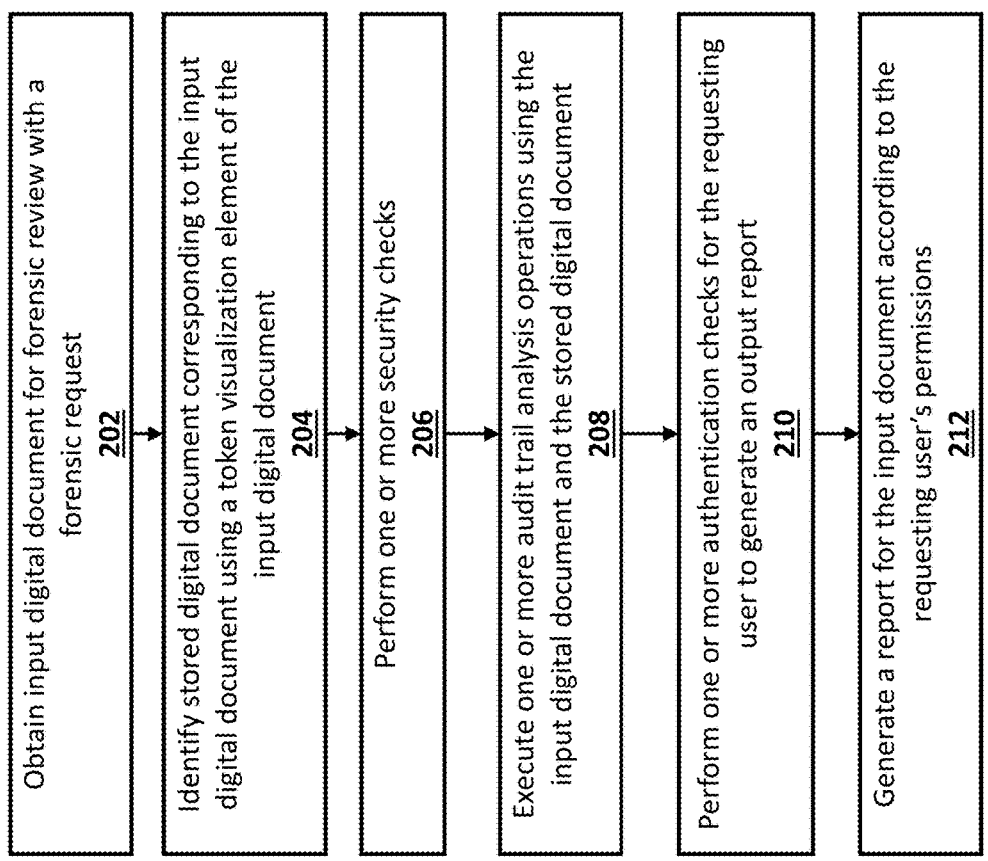
FIG. 2 shows executions steps of a method for performing forensic operations on an input digital document submitted for forensic review by a document handling service, according to an embodiment.

FIG. 2 shows executions steps of a method 200 for performing forensic operations on an input digital document submitted for forensic review by a submitting user to a document handling system associated with a document handling service. A server (e.g., management server 102) of the document handling system performs the steps of the method 200 by executing machine-readable software code installed on the server, though any number of computing devices and/or processors of the document handling system may perform the various operations of the method 200. Moreover, embodiments may include additional, fewer, or different operations than those described in the method 200.

In step 202, the server obtains an input digital document for forensic review and a forensic request from a client device. The server receives the forensic request via a webpage or via a cloud application hosted by the server. The forensic request indicates a forensic operation that a submitting user wants the server to perform to evaluate the trustworthiness of the particular input digital document with respect to a stored digital document purportedly corresponding to the input digital document. Non-limiting examples of the forensic operations may include determining a status of the input or stored digital document, performing a forensic review of the content and/or metadata of the input digital document, and determining a status of the signing-users who signed the stored digital documents, among any number of additional or alternative forensic operations. The forensic request or a visualization element of the input digital document indicates or includes a pointer to information about, for example, the signing-users, the input digital document, and/or the corresponding master digital document. The document information may include a document identifier, signing-user identifiers, permissions, and block identifier, among other types of information. The signer information may include the signing-user identifiers, users' cryptographic values (e.g., certificates, digital signatures), and the like.

The server obtains the input digital document by receiving the input digital document as an upload from the client device, or by querying and retrieving the input digital document from a particular computer file storage location, such as hard drive, a database, or a blockchain, according to the forensic request. The server may receive the input digital document in any machine-readable format and, in some cases, convert the input digital document into a second machine-readable format compatible with the server's forensic analysis software. For example, the server receives the input digital document in an image format (e.g., JPG, GIF, PNG) as an upload from the submitting user's client device, and converts the input digital document into a word processing or desktop publishing format (e.g., DOC, DOCX, ODT, PDF, XPS, OXPS).

In operation, the requesting user accesses a forensic review function hosted by the server of the document service to submit the forensic request. The requesting user submits the forensic request via an upload submission function of a website or via a locally executed software program of the document service installed on the client device. The forensic request includes the document information and/or the forensic operation parameters, including data for the server to obtain the input digital document and/or the stored digital document. For example, the forensic request is submitted with an upload of the input digital document. As another example, the forensic request includes document information or parameters containing document-identifying data (e.g., document identifier, title, visualization element), which may include an indication of the storage location of the input digital document or stored digital document. The server may use certain document information (e.g., document identifier, title, visualization element, signer certificates) of the input digital document identified by the server from the input digital document, or parameters entered by the submitting user, to retrieve the corresponding stored digital document.

In the method 200, the server obtains the input digital document as an upload from the client device or from a storage location indicated by forensic request from the client device. The input digital document includes the visualization element (e.g., QR code, barcode, image) that the server references to execute the method 200 and perform certain forensic operations, though the server need not reference visualization elements. The server may, in some embodiments, use various forms of document-identifying data, extracted as document information from the input digital document or received as parameters with the forensic request. Moreover, the server need not obtain or reference the input digital document in all embodiments. For example, the submitting user may only want to know the status of a previously executed document, but does not need the server perform a forensic analysis of the document's content or metadata. As such, the server may not need to reference an input digital document and would only need to reference the stored digital document. Accordingly, in some embodiments the submitting user's forensic request includes the document-identifying data for the stored digital document (e.g., document identifier, blockchain block identifier, title, document certificate), which the server references to query and retrieve the stored digital document from a particular storage location (e.g., database, blockchain block).

In some cases, the server receives a scanned version of the input digital document, where the input digital document is in a format without character-related metadata. In such cases, the server performs one or more optical character recognition (OCR) routines on the input digital document to identify the particular alphanumeric characters for content of the input digital document. In some embodiments, the server performs known OCR routines. And in some embodiments, the server applies a machine-learning architecture (e.g., machine-learning architecture 109) containing layers trained for OCR, where the layers of the machine-learning architecture extract features of the content that include the alphanumeric characteristic, but also features indicating word strings, language structure (e.g., paragraphs, line breaks), character-spacing, line-spacing, font(s), number of signatures, number of images, and other characteristics of the document content. The machine-learning architecture may also extract the corresponding features for the content of the master digital document to compare the respective feature sets, thereby improving the quality of the OCR output for the input digital document and mitigate an amount of computing guesswork. As described further below, in some implementations the server may apply the same or similar machine-learning architecture to determine a level of similarity or differences between the content of the input digital document and the master digital document. The machine-learning architecture may output the identified differences and/or output a score. The server may determine that the input digital document is too different (e.g., tampered with) from the master digital document if the score exceeds a threshold.

Figure 5:
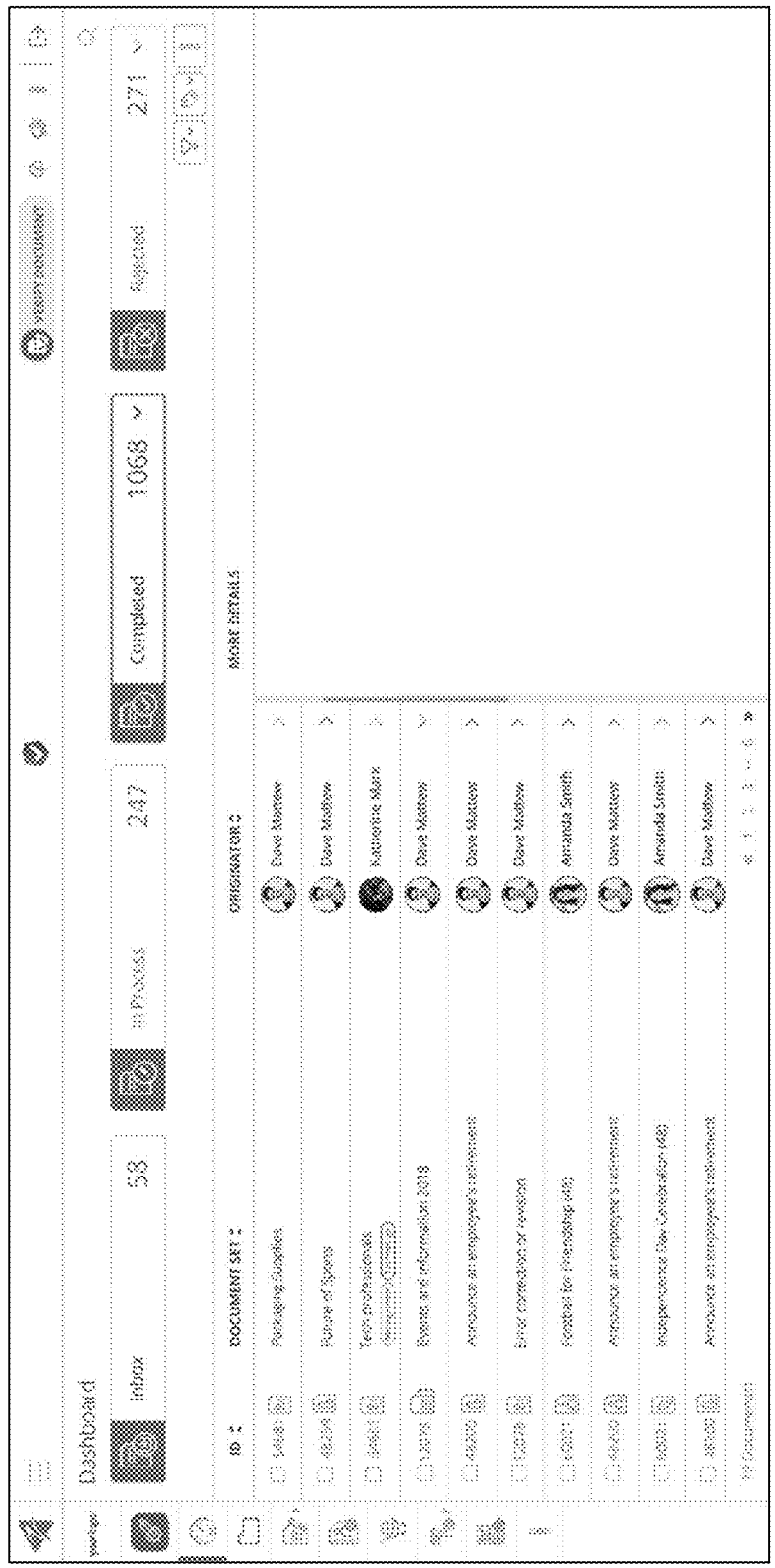
FIGS. 5-8 show example graphical user interfaces presented to user for interacting with a document handling system, according to an embodiment.
Figure 6:
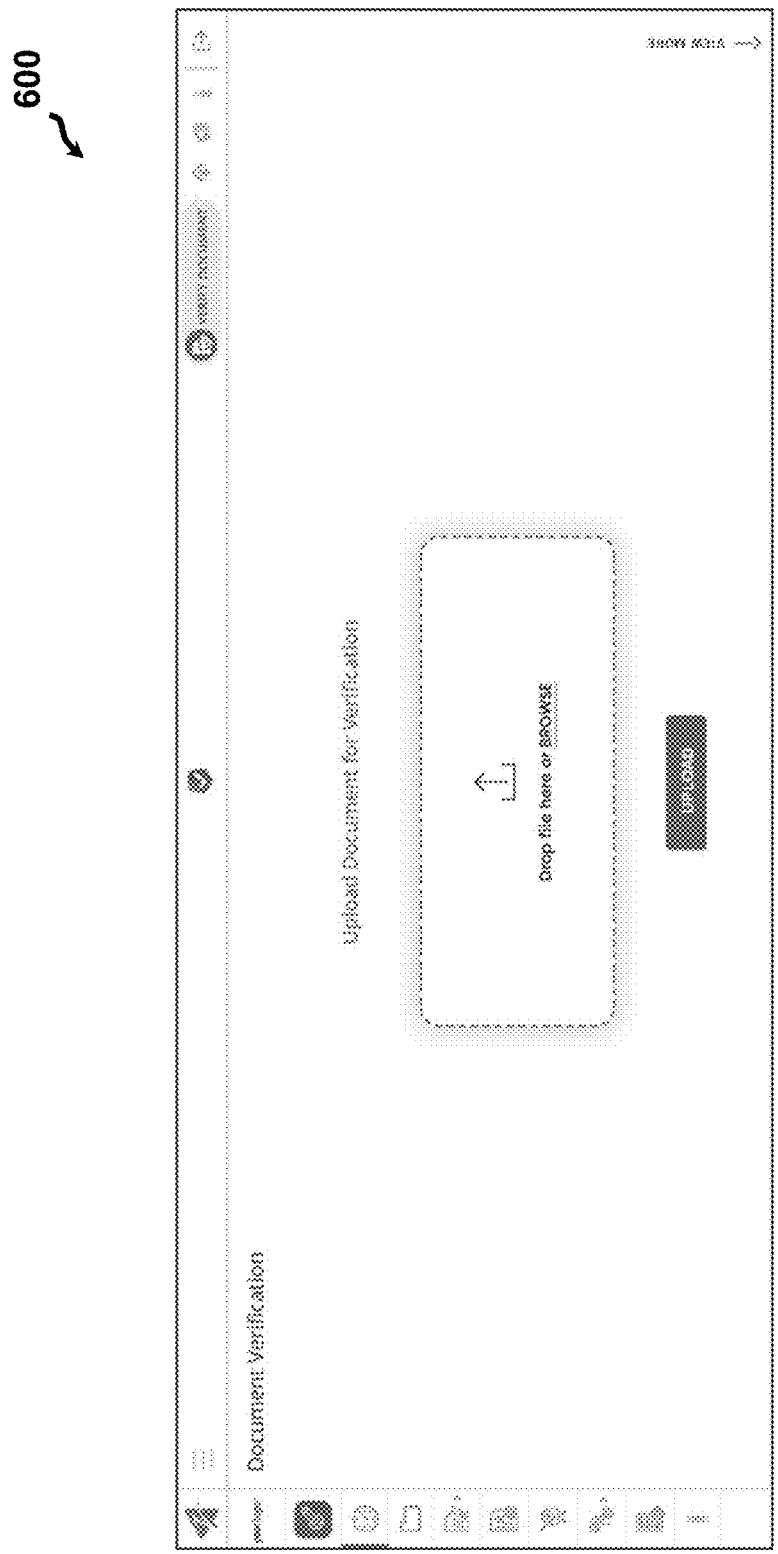

FIG. 5 shows an example GUI 500 for a registered user associated with digital documents. Some of the digital documents are being prepared, unsigned, and not yet finalized; while some of the digital documents are signed and finalized. The GUI 500 further includes an option to "verify document," allowing the registered user to submit a forensics request to the server for any particular input document that the registered user might receive through, or upload to, the document handling software. FIG. 6 shows an example GUI 600 allowing the registered user to upload the input document to the server, using the document handling software as shown in FIG. 5. The user may upload the input digital document in any number of formats, such as a word-processing document (e.g., DOC), a vectorized or structured document (e.g., PDF), or a scan or image of the document (e.g., PDF, JPG, PNG), among other potential formats.

In step 204, the server identifies the stored digital document corresponding to the input digital document using the visualization element (e.g., QR code, barcode, image) affixed to visual representations of the input digital document, in digital and hardcopy configurations. The server or other computing device coverts the visualization element into one or more types of machine-readable data. Non-limiting examples of the types of data extracted from the visualization element include document-identifying data, storage location data, signing-user identifiers, document permissions, public encryption keys, user certificates, and document certificates, among various other types of data or storage location indicators for such data.

The visualization element encodes one or more forms of document-identifying data associated with the stored digital document, including a document identifier for the stored digital document and/or a storage location identifier (e.g., database record identifier, blockchain block identifier) for the storage location containing the stored digital document. In operation, the server queries the storage location (e.g., database, blockchain) using the document-identifying data, as converted and extracted from the visualization element of the input digital document. If the visualization element of the input digital document is forged, then the server cannot identify the stored digital document in the queried storage location, because the server would not extract accurate or valid data from a forged visualization element. If the server's query is successful, then the server retrieves the stored digital document corresponding to the input digital document, where the stored digital document includes the same visualization element as the input digital document.

In some embodiments, the data converted from the visualization element includes a token representing the stored digital document. The server (or other computing device) previously generated the token when executing a process for initially generating or updating the stored digital document, prior to finalizing the stored digital document and each signing-user signed the stored digital document. When the server generates or updates the digital document before finalization, the server generates the token by algorithmically combining (e.g., concatenating), hashing, and/or encrypting certain data or metadata of the digital document. Non-limiting examples of the document data or metadata used to generate the token includes document content text, the signing-users' certificates, the signing-users' electronic signatures, document certificate, timestamps, a random value or seed, and blockchain identifiers, among various additional or alternative types of document data or metadata. Additionally or alternatively, in some embodiments, the server applies one or more encryption keys to the token to generate an encrypted token. The server generates the visualization element to represent the token, which the server graphically or visually affixes to one or more pages of the digital document and stores the digital document into one or more storage locations.

As an example, when the server initially generates and updates the digital document to apply the electronic signatures of each of the signing-users, the server generates the digital document's token as a hash of portions of the document content text, the signing-users' certificates, and the signing-users' electronic signatures. The server encrypts the data of the token to generate the encrypted token, by applying one or more encryption keys of the signing-users and/or the server to generate to the token data. The server generates a QR code as the visualization element representing the storage location of the digital document (e.g., database record, blockchain block) and the encrypted token. The server affixes the QR code to one or more pages of the digital document. When the digital document is accessed using corresponding document viewing software (e.g., PDF-viewer software, word-processing software), the QR code is represented visually via the software's user interface. Likewise, if the digital document were printed to hardcopy, then the digital document's hardcopy includes the QR code.

In step 206, the server performs one or more security checks for the forensic request. The security checks include, for example, determining whether the input digital document was generated and executed via the document management service, determining permissions of the stored digital document, determining the permissions of the requesting user, determining or validating the status of the document, and determining or validating the status of the requesting user, among other potential security check operations.

In operation, the server references the storage location (e.g., database record, blockchain block) of the stored digital document corresponding to the input digital document as indicated by the data extracted from the visualization element (in step 204). The storage location includes the document-related data for performing the one or more security checks, where the document data includes, for example, user permissions of the stored digital document, status information, user certificates or data for querying a certificate authority on the status of the user certificates, and/or a document certificate or data for querying the certificate authority on the status of the document certificate, among any number of types of document. The server may determine whether the stored digital document was generated and executed through the document management service based upon data of the visualization data or in response to successfully querying the storage location.

In some implementations, the server determines whether the requesting user (sometimes referred to as a "submitting user") has permissions to access the stored digital document and/or instruct the server to perform the requested forensic operation. The server may identify and confirm the requesting user's permissions according to any number of user authentication operations. For instance, the server may determine whether the requesting user was one of the signing-users based upon the user credentials that the requesting user entered to access the document service and submit the forensic request. The storage location for the stored digital document includes user identifiers corresponding to the user credentials of the signing-users, which the server references to determine whether the requesting user was a signing-user. As another example, the permissions indicate that third-party submitting users may access the stored digital document to request certain types of forensic operations. The third-party permissions may permit the requesting user to request the forensic operation, though the third-party permissions may be comparatively limited with respect to the permissions of signing-users. The third-party permissions may be open to the public or limited to user credentials of users registered with the server of the document service.

In step 208, the server executes one or more audit trail analysis operations using the input digital document and the stored digital document. The storage location for the stored digital document includes the audit trail data. The audit trail for the stored digital document includes various types of data indicating an auditable history for the stored digital document, which includes various types of document data generated during operations for generating the document, editing the document, and/or applying the signers' signatures to the document. The audit trail data may include the signing-user data for verification and authentication, such as signing-users' signatures, electronic certificates, and/or encryption keys. The audit trail data may further include document content data that includes the document content and/or that indicates changes to the document content.

When the document is generated, the server generates and stores the document data (e.g., document content, signing-user data) into a new data record in the database or a new block entry to the blockchain. In some implementations, as changes are made to the document data during updating operations, the server generates a new data record in the database or new entry to the blockchain, containing the updated document data. The updated document data includes, for example, the signing-user data (e.g., signing-user certificate, user identifier) of the signing-user who entered updates to the digital document, a timestamp, and the updated document content, among other potential types of updated document data that facilitates tracking and auditing the history of the digital document.

In some cases, the token and/or the visualization element include data indicating the changes to the document data (e.g., content, metadata) of the digital document as stored one or more data records (e.g., database records of the database, blocks of the blockchain). In such cases, the server generated the token and/or the visualization element for the digital document by encoding the document data (e.g., content, metadata), as well as the updated document data (e.g., updated content, updated metadata). The server converts and extracts the various types of data, across the entries of each updated version of the digital document, to conduct the audit trail analysis on the lifecycle history of the digital document.

In some implementations, the audit trail data may indicate the user identifiers for the users associated with particular processes of the stored digital document's lifecycle (e.g., processes for generating, updating, and/or signing the stored digital document). The server references the audit trail data to determine whether the submitting user was involved in one or more processes of the digital document's lifecycle. The server may determine the submitting user's access permissions and/or forensic request permissions based upon the submitting user's role (or lack thereof) in the digital document's lifecycle.

For example, the server may determine that the submitting user is a signing-user as indicated by the audit trail data or user credentials. The server may grant the submitting user full access permissions and full forensic request permissions, allowing the user to request and review detailed changes made to the content or metadata of the input digital document as compared to the content or metadata of the stored document. As another example, the server may determine that the submitting user is a third-party user based upon user credentials or the audit trail data not containing the user identifier of the submitting user. In this example, the server may return a binary indicator or limited document data indicating whether the input digital document was changed (e.g., tampered with) as compared to the stored digital document.

Additionally or alternatively, the third-party submitting user is limited only to requesting a document status or document certificate status, to determine whether the document expired or remains valid. For instance, the signing-users may generate the document with a 30 expiration date controlled by the server or by applying an electronic certificate having a 30-day expiration date controlled by the certificate authority.

In step 210, the server performs one or more document authentication or document verification checks for the forensic request according to the requesting user's permissions. For example, the server compares the input digital document to the stored digital document in the database or on the blockchain. The server verifies the authenticity of the electronic signatures, electronic certificates, token, or other data or metadata of the input digital document. The server may further verify the authenticity of the document content of the input digital document as compared to the stored digital document or based upon the audit trail analysis (in step 208).

In step 212, the server generates a report for the input digital document according to the requesting user's permissions and the request forensic operation. The server generates the report according to the programming languages and communication protocols needed for generating, transmitting, and presenting the report on the user interface of the client device. For instance, the server may transmit the report data via the Internet using TCP/IP and other communications protocols for Internet traffic. The client device may access the server by executing a locally installed software program or web browser, and the server transmits the report data in a format compatible with the local software program or interpreted by the browser. The report data includes the amount or scope of information allowed by the permissions afforded to the submitting user and in accordance with the forensics request.

Figure 7:
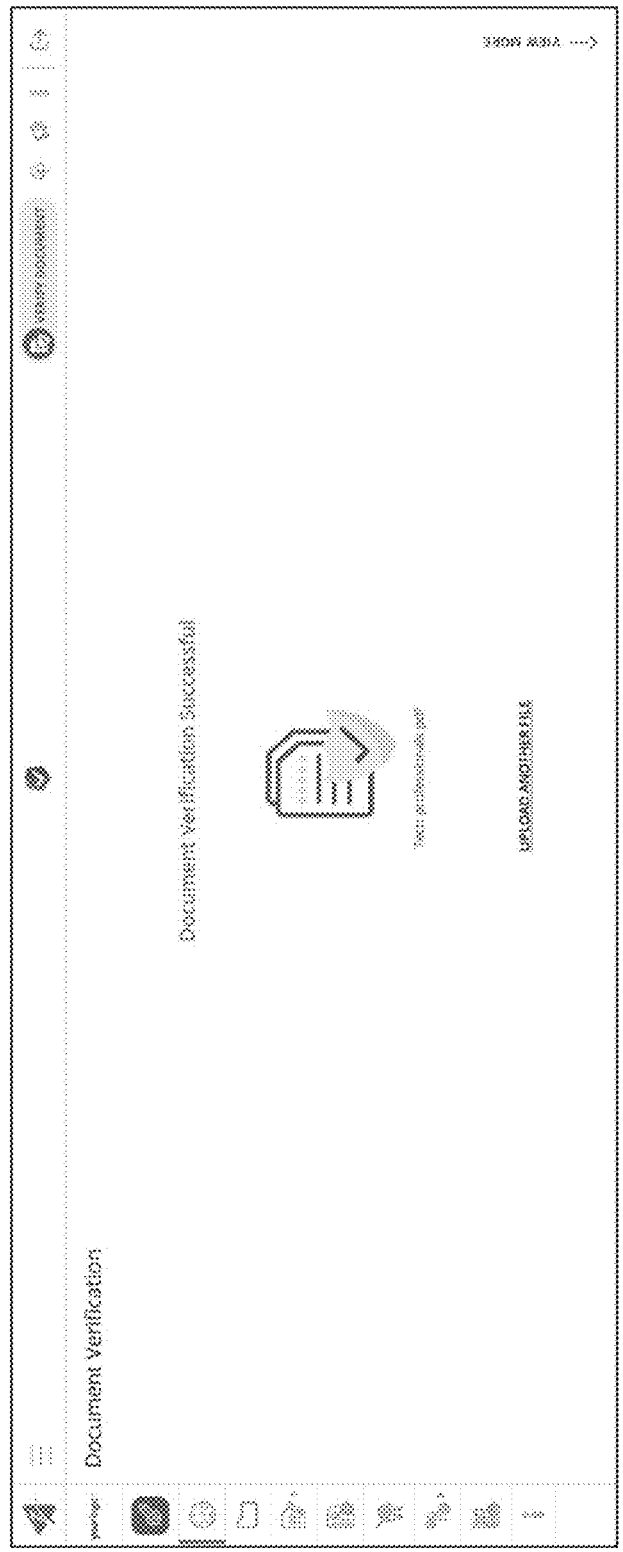
Figure 8:
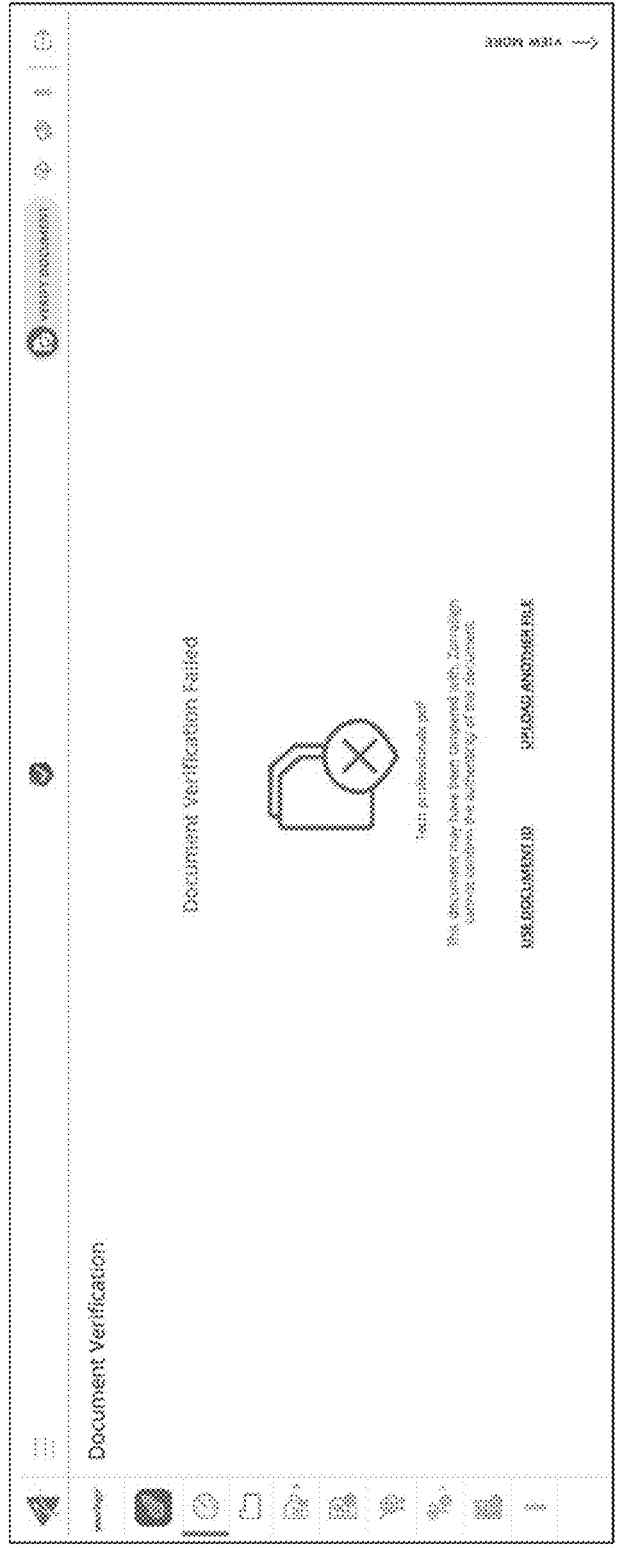

FIG. 7 shows an example GUI 700 displaying a report outputted by the server indicating that the forensic operations for document verification were successful. FIG. 8 shows an example GUI 800 displaying a report outputted by the server indicating that the forensic operations for document verification were unsuccessful.

Figure 3:
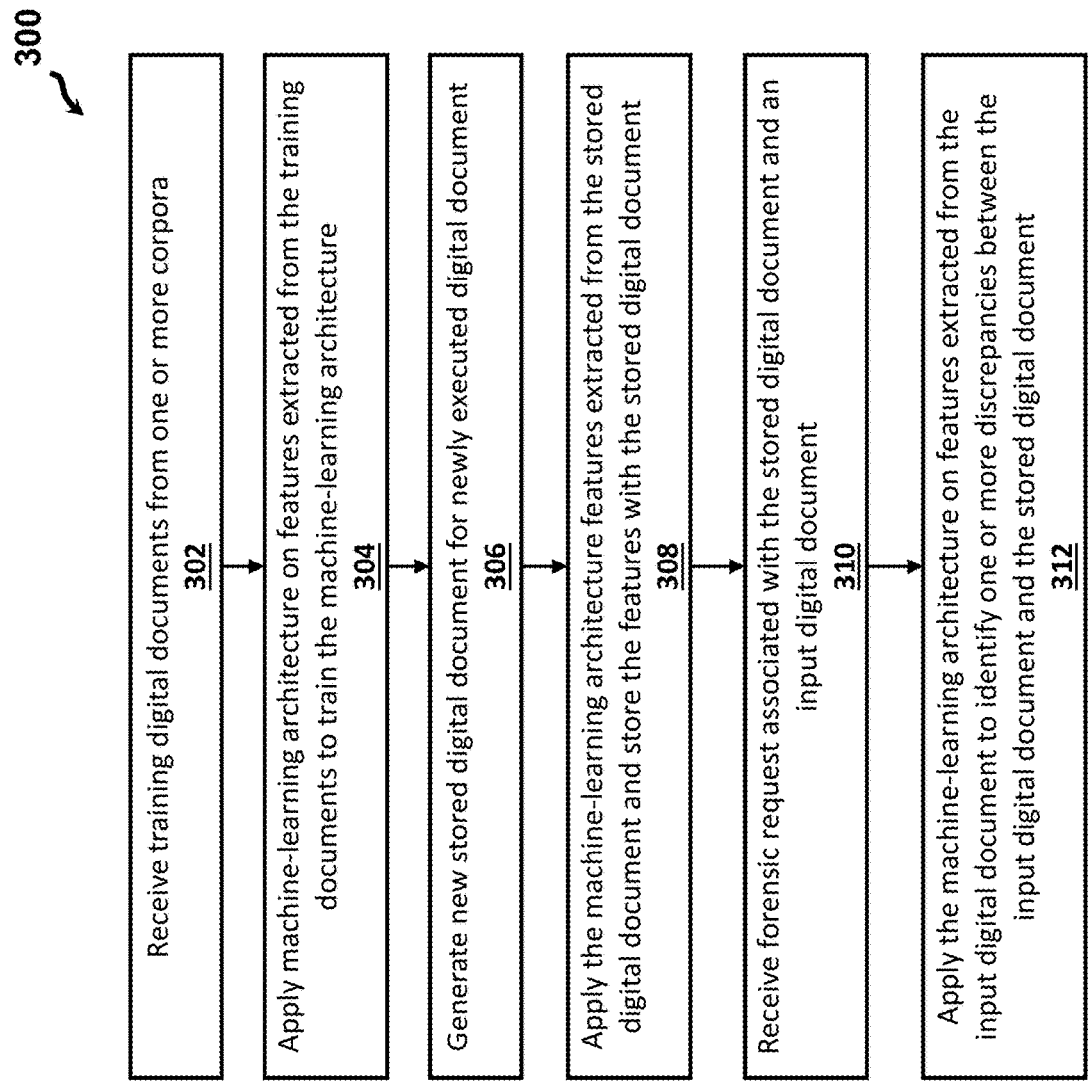
FIG. 3 shows execution steps of a method for managing machine-learning architectures for forensic operations by a document handling service, according to an embodiment.

FIG. 3 shows execution steps of a method 300 for managing machine-learning architectures for forensic operations by a document handling service. The document handling service operates a document handling system that applies the machine-learning architecture to digital documents for various types of forensic operations. A server of the document handling system performs the steps of the method 300 by executing machine-readable software code that includes the one or more machine-learning architectures, though any number of computing devices and/or processors of the document handling system may perform the various operations of the method 300. Embodiments may include additional, fewer, or different operations than those described in the method 300.

The machine-learning architecture executes the steps of the method 300 according to various operational phases, including a training phase, an optional development phase for tuning the machine-learning architecture for specific documents, and a deployment phase (sometimes called "testing"). In the testing phase, the server applies the machine-learning architecture on one or more corpora of digital documents to train and tune weights or parameters of the machine-learning architecture. In the optional development phase, the server applies the machine-learning architecture to a particular new digital document to tune the machine-learning architecture for the particular new digital document, or generate a model or vector representation for the new digital document. In the deployment phase, the server applies the machine-learning architecture on the input digital document and/or a corresponding stored digital document to determine a level of difference (sometimes called an amount of "discrepancies) between the input digital document and the corresponding stored digital document.

The machine-learning architecture comprises functions or layers that perform the various processing operations discussed herein. The layers and operations of the machine-learning architecture define components of the machine-learning architecture, which may be separate architectures or sub-architectures. The components may include various types of machine-learning techniques or functions, such as neural network architectures, nearest-neighbor algorithms, clustering algorithms, or Gausian mixture models (GMMs), among others.

In step 302, the server receives training digital documents from one or more corpora hosted by one or more databases. The server may receive the training digital documents from the databases containing the one or more corpora. In some cases, the training digital documents are associated with labels indicating the features of the training digital documents or whether the training digital documents contain forged or missing content.

In step 304, the server applies the machine-learning architecture on various features extracted from the training documents to train the machine-learning architecture. The server feeds the training digital documents to the machine-learning architecture, which the machine-learning architecture uses to generate the predicted output (e.g., predicted features, predicted content, predicted forgery classification) by applying the current machine-learning architecture on features extracted from each particular training digital document. The machine-learning architecture references the labels, and determines a level of error using the labels and the predicted output of the machine-learning architecture.

In step 306, the server generates a new master digital document. The signing-users operate a client device that accesses the server processes for generating and editing the new master digital document according to various user inputs. In particular, the server generates and updates the master digital document in accordance with the user input instructions that the server received from the client devices of the users. Signing-users may apply electronic signatures and/or digital signatures to the unexecuted master digital document, thereby executing and finalizing the new master digital document.

In some implementations, the server generates a token and visualization element based upon the document data (e.g., content, metadata). The server then affixes the visualization element to the master digital document. The server may encrypt the token and encode the token into the visualization element prior to affixing the visualization element to the new master digital document.

When the master digital document is finalized, the server stores the master digital document into a storage location (e.g., new database record, new blockchain block), as a new stored digital document, along with one or more types of metadata associated with the stored digital document, such as user certificates, a document certificate, document permissions, timestamps, and user identifiers, among other potential types of metadata.

In optional step 308, the server applies the machine-learning architecture on various types of document features extracted for content and/or metadata of the stored digital document and stores the features with the stored digital document. The features may be stored with the metadata of the stored digital document or encoded into the token or the visualization element of the stored digital document. In some embodiments, the server references these pre-extracted and stored features when determining similarities or differences between input digital documents and the master digital document stored in the data records (as in step 312). The current step is optional because many machine-learning techniques do not require the features of the master digital document to be pre-extracted and stored.

In step 310, the server receives a forensic request for an input digital document that purportedly corresponds to the stored master digital document. The server may receive the input digital document as an upload from the client device of a requesting user. The input digital document includes the visualization element that the server references to identify the corresponding stored digital document (generated in steps 306-308) and various other types of document data of the stored digital document.

In step 312, the server applies the machine-learning architecture on the features extracted from the input digital document and the features extracted from the stored master digital document to identify a level of similarity or difference (e.g., one or more discrepancies or similarities) between the document data (e.g., content, metadata) of the input digital document and the stored digital document. The server may evaluate the similarities or differences using the document data and the updated document data from one or more update iterations of the stored digital document through the digital document's lifecycle, where the document data and updated document data define audit trail data indicated by the iterative data records generated for the master digital document. In some cases, the server generates a score indicating the level of similarity or difference between the input digital document and the stored digital document. In some implementations, the server or machine-learning architecture identifies particular discrepancies, such as different content text, in the input digital document based upon one or more content comparison algorithms.

The server may generate and output a report to the client device based upon the results of applying the machine-learning architecture to the input digital document. The report includes information based on the forensics operation performed by the server in response to the forensics request. Moreover, the report includes an amount of information relative to permissions afforded to the submitting user.

Figure 4:
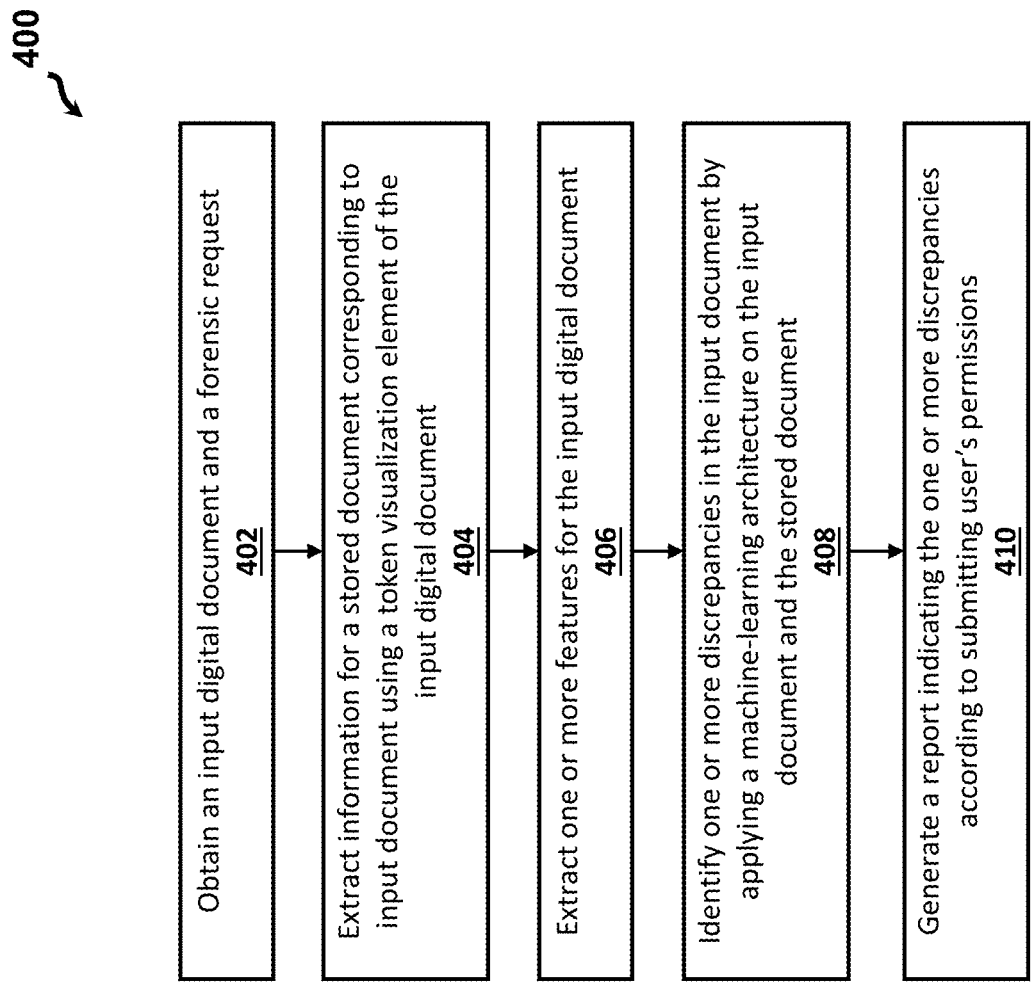
FIG. 4 shows execution steps of a method for performing forensic operations using one or more machine-learning architectures by a document handling service, according to an embodiment.

FIG. 4 shows execution steps of a method 400 for performing forensic operations using one or more machine-learning architectures by a document handling service. The document handling service operates a document handling system that applies the machine-learning architecture to an input digital document received from a submitting user. A server of the document handling system performs the steps of the method 400 by executing machine-readable software code that includes the one or more machine-learning architectures, though any number of computing devices and/or processors of the document handling system may perform the various operations of the method 400. Embodiments may include additional, fewer, or different operations than those described in the method 400.

The machine-learning architecture comprises functions or layers that perform the various processing operations discussed herein. The layers and operations of the machine-learning architecture define components of the machine-learning architecture, which may be separate architectures or sub-architectures. The components may include various types of machine-learning techniques or functions, such as neural network architectures, nearest-neighbor algorithms, clustering algorithms, or Gausian mixture models (GMMs), among others.

In step 402, the server obtains an input digital document for forensic review and a forensic request associated with the input digital document. The server may obtain the input digital document by receiving the input digital document as an upload from a client device or by retrieving the input digital document from a storage location (e.g., database, blockchain entry). The forensic request includes instructions and parameters for the server to perform one or more forensic operations. For instance, the forensic request includes the uploaded input digital document or indicates the storage location for the input document. FIG. 1 and FIG. 2 (e.g., step 202) include examples for obtaining the input digital document and/or obtaining a corresponding stored digital document, and further examples need not be included here.

In step 404, the server extracts information for a stored digital document corresponding to the input digital document using a visualization element of the input digital document. The server identifies the stored digital document corresponding to the input digital document using the visualization element (e.g., QR code, barcode, image) affixed to visual representations of the input digital document, in digital and hardcopy embodiments. The server or other computing device coverts the visualization element into one or more types of machine-readable data, including document-identifying data that the server uses to query a storage location (e.g., database record, blockchain block) containing the stored digital document. FIG. 1 and FIG. 2 (e.g., step 202) include examples for extracting and converting information for the stored digital document corresponding to the input digital document, and further examples need not be included here.

The document information of the stored digital document may include one or more features used by the machine-learning architecture for determining discrepancies with the input digital document. In some implementations, the visualization element of the input digital document, or a token represented by the visualization element, includes the features of the stored digital document. In some implementations, the storage location containing the stored digital document further contains the features of the stored digital document. The server previously extracted the set of features of the stored digital document from the document's content data and/or metadata. The server need not extract the features for the stored digital document at an earlier point, but may extract the features when the server receives the forensic request for the input digital document.

In step 406, the server extracts one or more features of the input digital document. The server may extract the set of features from the input document's content data and/or metadata, where the server extracts the same or similar types of features from the input digital document as features extracted from the corresponding stored digital document.

In step 408, the server identifies a level of similarity or difference (e.g., one or more discrepancies or similarities) for the input digital document by applying the machine-learning architecture on the features of the input digital document and the features of the stored digital document. The server may evaluate the similarities or differences using data from one or more evolution of the stored digital document in the lifecycle, as indicated by entries of audit trail data. In some cases, the server generates a score indicating the level of similarity or difference between the input digital document and the stored digital document. In some implementations, the server or machine-learning architecture identifies particular discrepancies, such as different content text, in the input digital document based upon one or more content comparison algorithms.

In step 410, the server generates a report according to permissions afforded to the requesting user. The report may contain certain types report data or level of detail based upon the requesting user's permissions. If the requesting user has higher permissions, then the server may indicate more detailed report data (e.g., indicating the one or more discrepancies). Where the requesting user has lower permissions, then the server may indicate less detailed report data (e.g., a binary indicator whether the input digital document was tampered with or identical to the stored digital document).

For example, the server may determine that the submitting user is a signing-user as indicated by the audit trail data or user credentials. The server may grant the submitting user full access permissions and full forensic request permissions, allowing the user to request and review detailed changes made to the content or metadata of the input digital document as compared to the content or metadata of the stored document. As another example, the server may determine that the submitting user is a third-party user based upon user credentials or where the audit trail data does not contain the user identifier of the submitting user. In this example, the server may return the binary indicator indicating whether the input digital document was changed (e.g., tampered with) as compared to the stored digital document.

The server generates the report according to the programming languages and communication protocols needed for generating, transmitting, and presenting the report on the user interface of the client device. For instance, the server may transmit the report data via the Internet using TCP/IP and other communications protocols for Internet traffic. The client device may access the server by executing a locally installed software program or web browser, and the server transmits the report data in a format compatible with the local software program or interpreted by the browser. The report data includes the amount or scope of information allowed by the permissions afforded to the submitting user and in accordance with the forensics request.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
obtaining, by a computer, an input digital document having a visualization element having encoded data representing an association between the input digital document and a master digital document, and a first set of one or more features of the input digital document;
obtaining, by the computer, the master digital document from a storage location by querying the storage location using the visualization element, and a second set of features of the master digital document;
identifying, by the computer, one or more discrepancies in the input digital document by applying a machine-learning architecture on the first set of one or more features of the input digital document and the second set of features of the master digital document; and
generating, by the computer, a report for display at a client device according to the one or more discrepancies in the digital document.

2. The method according to claim 1, further comprising receiving, by the computer, a forensics request from a client device, the forensics request indicating one or more forensics operations to be performed and the input digital document.

3. The method according to claim 2, further comprising receiving, by the computer, the input digital document from the client device via an upload transmitted with the forensics request.

4. The method according to claim 1, further comprising identifying, by the computer, a storage location of the master digital document according to the visualization element of the input digital document, the storage location containing the master digital document includes at least one of a database record of a database and a block of a blockchain.

5. The method according to claim 1, further comprising extracting, by the computer, the first set of features of the input digital document, and the second set of features of the master digital document, each feature based upon at least one of document content and metadata.

6. The method according to claim 1, wherein a discrepancy includes at least one of a manipulation of a digital signature and a manipulation of content of the digital document.

7. The method according to claim 1, further comprising:
identifying, by the computer, an electronic certificate of a signing-user associated with an electronic signature in the master document; and
determining, by the computer, a validity status of the electronic certificate of the signing-user by querying a certificate authority.

8. The method according to claim 1, further comprising:
identifying, by the computer, an electronic certificate of the master digital document using data extracted from the visualization element of the input digital document; and
determining, by the computer, a validity status of the electronic certificate of the document by querying a certificate authority.

9. The method according to claim 1, further comprising:
identifying, by the computer, one or more permissions associated with the master digital document stored in a data record for the master digital document, the one or more permissions indicated by a signing-user of the master digital document; and
determining, by the computer, that a submitting user associated with the forensics request has a permission to access the master digital document based upon the one or more permissions associated with the master digital document.

10. The method according to claim 9, further comprising identifying, by the computer, an account for a submitting user stored in a database, the account indicating the permission for the submitting user.

11. The method according to claim 9, wherein the submitting user is an unregistered submitting user, the method further comprising:
determining, by the computer, that the one or more permissions associated with the master digital document includes the permission for the unregistered submitting user to access the master digital document associated with the forensics request.

12. The method according to claim 1, further comprising:
identifying, by the computer, audit trail data for the master digital document stored in one or more data records, the audit trail data indicating one or more updates to content or metadata of the master digital document, one or more user permissions for users associated with the one or more updates, and a validity status; and
determining, by the computer, based upon the audit trail data, at least one of a permission of the submitting user and the validity status of the master digital document.

13. A system comprising:
a computing device comprising a processor coupled to a memory configured to:
obtain an input digital document having a visualization element having encoded data representing an association between the input digital document and a master digital document, and a first set of one or more features of the input digital document;
obtain the master digital document from a storage location by querying the storage location using the visualization element, and a second set of features of the master digital document;
identify one or more discrepancies in the input digital document by applying a machine-learning architecture on the first set of one or more features of the input digital document and the second set of features of the master digital document; and
generate a report for display at a client device according to the one or more discrepancies in the digital document.

14. The system according to claim 13, wherein the computing device is further configured to:
receive a forensics request from a client device, the forensics request indicating one or more forensics operations to be performed and the input digital document; and
receive the input digital document from the client device via an upload transmitted with the forensics request.

15. The system according to claim 13, wherein the computing device is further configured to:
identify a storage location of the master digital document according to the visualization element of the input digital document, the storage location containing the master digital document includes at least one of a database record of a database and a block of a blockchain.

16. The system according to claim 13, wherein the computing device is further configured to:
identify an electronic certificate of a signing-user associated with an electronic signature in the master document; and
determine a validity status of the electronic certificate of the signing-user by querying a certificate authority.

17. The system according to claim 13, wherein the computing device is further configured to:
identify an electronic certificate of the master digital document using data extracted from the visualization element of the input digital document; and
determine a validity status of the electronic certificate of the document by querying a certificate authority.

18. The system according to claim 13, wherein the computing device is further configured to:
identify one or more permissions associated with the master digital document stored in a data record for the master digital document, the one or more permissions indicated by a signing-user of the master digital document; and
determine that a submitting user associated with the forensics request has a permission to access the master digital document based upon the one or more permissions associated with the master digital document.

19. The system according to claim 18, further comprising a database configured to store a plurality of registered user data records, wherein the computing device is further configured to identify in the database a registered user data record for the submitting user, the registered user data recording indicating the permission for the submitting user.

20. The system according to claim 18, wherein the submitting user is an unregistered submitting user, and wherein the computing device is further configured to determine that the one or more permissions associated with the master digital document includes the permission for the unregistered submitting user to access the master digital document associated with the forensics request.

21. A computer-implemented method comprising:
receiving, by a computer, one or more update inputs for a master digital document from a client device, the update inputs associated with at least one of content of the master digital document and metadata of the master digital document;
for an iteration of one or more iterations of receiving the one or more update inputs:

generating, by the computer, a hash for the master digital document using the update inputs and a visualization element affixed to the master digital document;

generating, by the computer, a blockchain block containing the particular iteration of the master digital document using the hash of the master digital document for the particular iteration;

receiving, by a computer, an input digital document having the visualization element having encoded data representing an association between the input digital document and the master digital document;

identifying, by the computer, one or more blockchain blocks containing one or more iterations of the input digital document; and identifying, by the computer, one or more discrepancies in the input digital document by applying a machine-learning architecture on a first set of one or more features of the input digital document and a second set of features of the master digital document.

\* \* \* \* \*